United States Patent [19]

Hudson et al.

[11] Patent Number: 4,877,507

[45] Date of Patent: * Oct. 31, 1989

[54] LININGS FOR ALUMINUM REDUCTION CELLS

[75] Inventors: Tom J. Hudson, Beaconsfield; John McIntyre, Kingston; Pierre Tremblay, Chicoutimi; Claude Allaire, Chicoutimi-Nord; Bohdan Gnyra, Kingston, all of Canada

[73] Assignee: Alcan International Limited, Montreal, Canada

[*] Notice: The portion of the term of this patent subsequent to Oct. 31, 2005 has been disclaimed.

[21] Appl. No.: 218,834

[22] Filed: Jul. 13, 1988

Related U.S. Application Data

[63] Continuation-in-part of Ser. No. 138,503, Dec. 24, 1987.

[30] Foreign Application Priority Data

Jul. 14, 1987 [CA] Canada .................................. 542053
Aug. 28, 1987 [CA] Canada .................................. 545660

[51] Int. Cl.⁴ .......................... C25C 3/08; C21B 7/04; C04B 35/10
[52] U.S. Cl. ................................ 204/243 R; 204/294; 204/243 M; 266/280; 501/153
[58] Field of Search ............ 204/243 R, 244, 245–247, 204/67, 294; 501/153; 266/280

[56] References Cited

U.S. PATENT DOCUMENTS

| | | | |
|---|---|---|---|
| 3,580,835 | 5/1971 | Peterson | 204/243 R |
| 3,723,287 | 3/1983 | Elliott | 204/243 R |
| 3,960,696 | 6/1976 | Wittner | 204/245 |
| 4,376,690 | 3/1983 | Kugler | 204/243 R |
| 4,392,925 | 7/1983 | Alder et al. | 204/67 |
| 4,612,103 | 9/1986 | Dewing et al. | 204/243 R |
| 4,613,418 | 9/1986 | Dewing et al. | 204/243 R |
| 4,737,254 | 4/1988 | Gesing et al. | 204/243 R |

FOREIGN PATENT DOCUMENTS

| | | |
|---|---|---|
| 0132031 | 1/1985 | European Pat. Off. . |
| 0145411 | 6/1985 | European Pat. Off. . |
| 0165754 | 12/1985 | European Pat. Off. . |
| 0215590 | 3/1987 | European Pat. Off. . |
| 1206604 | 9/1970 | United Kingdom . |

Primary Examiner—Donald R. Valentine
Attorney, Agent, or Firm—Cooper & Dunham

[57] ABSTRACT

The amount of electrically conductive material in the bottom floor lining of a conventional aluminum reduction cell is reduced by using a non-conductive lining material in its place. The non-conductive material separates the remaining electrically conductive regions form the sidewall linings of the cell and preferably confines the electrically conductive material to the "anode shadow" region of the cell floor. The non-conductive material preferably comprises a particulate alumina mixture made up of large shapes which firmly compact together and smaller particles which fill the remaining voids. Optionally, the mixture may be bonded together with amorphous alumina, in which case the mixture can also be used for cell wall linings. The linings can be used in reduction cells of conventional design and reduces undesirable magnetohydrodynamic effects as well as pollution hazards caused by conventional carbonaceous cell linings.

61 Claims, 2 Drawing Sheets

LININGS FOR ALUMINUM REDUCTION CELLS

BACKGROUND OF THE INVENTION

1. Field of the Invention

This invention relates to linings used for aluminum reduction cells and is a continuation-in-part of U.S. application Ser. No. 138,503, filed Dec. 24, 1987, pending.

2. Description of the Prior Art

Conventional aluminum reduction cells form a bath for a cryolite-based electrolyte containing dissolved alumina. Carbon anodes dip into the bath from above and are progressively consumed. The cell floor and walls are made up of carbon blocks bonded together with carbonaceous cement, or may be formed by using a rammed mixture of carbonaceous material and pitch. As electrolysis proceeds, a layer of molten product aluminum is built up on the carbon floor of the bath, from where it is tapped from time to time. The layer or "pad" of molten metal constitutes, together with the carbon floor, the cathode of the cell.

There are several disadvantages to the use of carbon linings for such cells. Firstly, the carbonaceous products used as carbon block cements or ramming mixes pose environmental hazards because of the fumes which are generated when such products are heated. Secondly, carbon linings are attacked by molten cryolite electrolytes and care has to be taken to protect such linings. Thirdly, strong magnetic forces generated by the high current levels associated with such cells give rise to magnetohydrodynamic effects which may cause instability of the molten metal pad.

Attempts have been made to find effective alternatives to carbon linings, for example as disclosed in our Dewing U.S. Pat. No. 4,647,357 issued on Mar. 3, 1987 and in our European patent application Ser. No. 86306584.3 filed on Aug. 26, 1986 (and published on Mar. 25, 1987 under Publication No. 0215590). While the materials disclosed in these references are extremely effective, their use requires a modification of the normal cell design because current must be collected from the molten metal pad by high temperature-resistant refractory hard metal current collectors which extend upwardly through the non-conductive layer. Consequently, the new materials cannot conveniently be used to replace the bottom linings of existing conventional aluminum reduction cells.

SUMMARY OF THE INVENTION

An object of the invention is therefore to provide cell linings which can be used in conventional cells and which reduce the amount of electrically conductive cell lining material used in such cells.

The present invention is based on the finding that partial, rather than complete, replacement of the electrically conductive cell floor lining with a non-conductive refractory material not only avoids the need to change existing cell designs but also results in reduced environmental hazards and improved cell operation provided that certain specific parts of the cell floor lining are replaced. Indeed, if the environmental hazards of using carbonaceous materials as electrically conductive cell linings are to be eliminated entirely, a non-carbonaceous refractory electrically conductive cell lining material may be used in place of the carbonaceous material in conjunction with the electrically non-conductive refractory material in order to produce specific electrically conductive and non-conductive regions of the cell lining.

Thus, according to one aspect of the invention, there is provided an aluminum electrolytic cell having a cell floor and cell walls for containing liquid cell components comprising aluminum and an electrolyte, a lining for said cell floor, a lining for said cell walls and one or more anodes capable of dipping into said liquid electrolyte from above and each having an anode surface spaced from but confronting said cell floor lining, said cell floor lining, at least at the upper surface thereof, comprising a region made of solid refractory electrically conductive material, and at least one region made of a solid refractory electrically non-conductive material extending between the electrically conductive material and the cell wall lining, and at least one current collector bar extending from outside the cell into said cell floor lining beneath said upper surface and forming electrically conductive contact with said solid electrically conductive material.

In one embodiment of the invention the electrically conductive material consists of carbonaceous material.

When the electrically conductive material is a non-carbonaceous material, it should preferably be in a form which can readily be used in conventional cells without substantial modification of the cell design, i.e. in much the same way that carbonaceous lining materials are used to conduct current between the molten metal pad and conventional generally horizontal current collector bars. This enables conventional cells to be retro-fitted with the new lining materials without requiring expensive and technically complex modifications.

The solid refractory electrically non-conductive material may be any material that can withstand the conditions encountered in the cell, i.e. high temperature and exposure to molten aluminum and molten cryolite. The material may be in particulate, block or continuous form and is preferably alumina based. Particular examples are described in more detail below.

A preferred refractory non-conductive material for use in the present invention is the one disclosed in our European patent application Ser. No. 86306584.3 mentioned above. This material is an unbonded close packed array of alumina shapes, the gaps between the shapes being substantially filled with particulate alumina in one or more fractions having discrete particle size ranges, including a fraction having an average particle diameter of not more than 20% of the average diameter of the shapes. The alumina shapes and particles pack tightly together to form a layer having a bulk density of at least 2.0 g/cc. Further details of the material can be obtained from the published application, the disclosure of which is incorporated herein by reference.

Since the material is unbonded, it can only be used to form parts of the cell floor lining. However, it has now been found that the shapes and particles can be bonded together by an amorphous alumina binder and that the resulting bonded material is self-supporting and can be used to form parts of the sidewall lining of the cells. This enables more of the carbonaceous lining of the conventional cell to be replaced and is a novel additional aspect of the invention.

Another material suitable as a refractory non-conducting material for use in the present invention is the alumina based layer disclosed in our U.S. Pat. No. 4,647,357 also mentioned above. This material comprises alumina containing a layer rich in an alkali or alkaline earth metal compound (preferably an alkali metal fluoride, oxide, carbonate or aluminate or an alkaline earth metal oxide or carbonate) in free or combined form, which upon penetration of the lining by the electrolyte, dissolves in or reacts with the electrolyte so as to raise the solidus thereof and prevent further penetration of the electrolyte into the layer. The disclosure of the U.S. patent is incorporated herein by reference.

Another suitable material is a calcined red mud as disclosed in our pending Canadian patent application Ser. No. 552,914 filed on Nov. 26, 1987 in the name of Claude Allaire. This material is produced by calcining red mud (a waste product of the alumina production process) at high temperature (e.g. 900°–1400° C.) in air for a period of about 5 to 10 hours, grinding the product following calcination to the −4 Tyler mesh range (preferably −65 Tyler mesh), mixing the ground product with a binder (e.g. colloidal silica, colloidal alumina and sodium silicate) and sufficient water to produce a formable mixture, forming the mixture into a desired shape and firing the shaped product (e.g. at 1000°–1200° C.) to produce the desired refractory material. The disclosure of the Canadian application is incorporated herein by reference.

Another suitable electrically non-conductive material can be prepared from smelter alumina, concentrated aqueous sodium aluminate solution ($NaAlO_2$ or $Na_2O\cdot Al_2O_3$ containing up to 10% free $Na_2O$) and smaller amounts of fine powder cryolite ($3NaF\cdot AlF_3$). The alumina and the cryolite are first thoroughly premixed in the dry state and the premixed powder is then added to aluminate solution at between 20° C. and 100° C. Mixing is usually carried out for 5–10 minutes and the mixture is then cast, dried and calcined at up to 800° C. Suitable formulations are as follows:

|  | General Formulation (% by wt) | Specific Preferred Formulation |
| --- | --- | --- |
| $Al_2O_3$ | 20–70 | 60 |
| Cryolite | 0–50 | 15 |
| Aluminate (dry basis) | 10–30 | 25 |

The concentrated sodium aluminate solution can be prepared in situ by dissolving alumina trihydrate ($Al_2O_3\cdot 3H_2O$ e.g. 580 kg) in sodium hydroxide solution (containing 340 kg NaOH in 500 kg water), at boiling point and atmospheric pressure and then adding water (e.g. enough to make up the entire batch to 1000 litres total volume). The resulting calcined product is a dimensionally stable, non-consumable refractory material which can be used to replace the carbonaceous material of the bottom wall lining and/or the side wall lining (e.g. when cast into blocks or applied in situ as a large monolith using practices employed for castable refractories).

Yet another suitable material is a castable refractory based on smelter-type alumina in which the main cementing component is $CaO\cdot Al_2O_3$ and said smelter type $Al_2O_3$ (e.g. Alcan C-1 $Al_2O_3$) is the main filling-in component by itself or in combination with either fused $Al_2O_3$—$SiO_2$ and/or fine fused silica of −16 Tyler mesh or −32 Tyler mesh. The following three particular mixes are preferred:
 (1) $4\ Al_2O_3 + 4CaO\cdot Al_2O_3 + 3H_2O$
 (2) $2.5\ Al_2O_3 + 2.5Al_2O_3\cdot SiO_2 + 5CaO\cdot Al_2O_3 + 3H_2O$
 (3) $3\ Al_2O_3 + 3SiO_2(fused) + 3CaO\cdot Al_2O_3 + 3H_2O$ These mixes can be cast in place or pre-formed into blocks or the like.

If desired, the above alumina-based refractory materials may also be subjected to the protective surface treatment disclosed in our Bohdan Gnyra. U.S. Pat. No. 4,681,819 issued on July 21, 1987. This treatment increases the protection of the refractory against attack by molten aluminum metal and involves impregnation of the surface of the material with an aqueous solution of magnesium fluorosilicate (optionally including colloidal alumina) followed by heating to decompose the magnesium fluorosilicate to produce, in situ, fluoride values that inhibit wetting of the treated surfaces by the molten metal. A silicate coating may be applied over the impregnated surface and, after drying, this coating may itself be impregnated with a further application of the magnesium fluorosilicate solution.

DETAILED DESCRIPTION OF THE PREFERRED EMBODIMENTS

Figure 1:
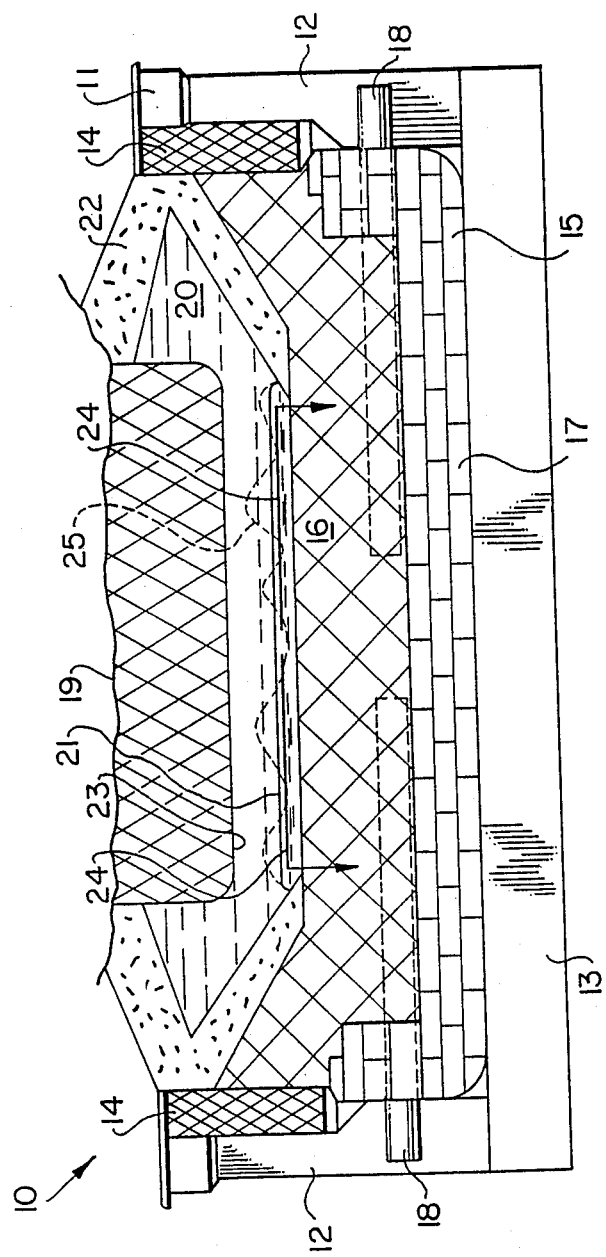
FIG. 1 is a cross-section of a conventional aluminum reduction cell showing the various cell components and linings.

Throughout the several views, identical parts are indicated by the same reference numerals.

So that the present invention and its advantages may be precisely understood, reference is first made to FIG. 1 which shows a transverse cross-section of a conventional aluminum electrolytic reduction cell. The cell 10 has a steel shell 11 having side walls 12 and bottom wall 13. The side walls 12 have a lining 14 made of carbon or a carbonaceous material. Bottom wall 13 has a lining 15 made of carbon blocks 16 in the upper region and insulating alumina blocks 17 in the lower region. A carbonaceous cement is packed into the joints between the carbon blocks 16 to form a monolithic lining. Current collector bars 18 extend from outside the shell 11 laterally and horizontally into slots cut into the lower surfaces of the carbon blocks 16 and make electrical contact with the blocks. A carbon anode 19 extends into the cell from above and can be raised or lowered as desired. During use, the cell contains a layer 20 of molten cryolite electrolyte containing alumina and a layer (or pad) 21 of molten aluminum forms progressively. Solidified (so-called frozen) electrolyte 22 forms at the side walls and at the periphery of the cell bottom wall as well as extending around the anodes. This frozen electrolyte 22 is carefully controlled so that it extends along the bottom wall of the cell partially beneath the confronting surfaces 23 of the anode, this being referred to as partially within the "shadow" of the anode. There are two reasons for this, namely the solidified electrolyte protects the peripheral regions of the cell bottom lining from attack by molten electrolyte (should the molten aluminum layer fail to protect these regions) and the frozen electrolyte also tends to reduce horizontal current components in the anode. These current components tend to form because the layer 21 of molten aluminum is much more electrically conductive than the carbon lining 16 and so current (indicated by arrows 24) flows more readily horizontally than directly vertically to the current collector bars 18. The horizontal current flow interacts with the local magnetic field to develop forces which further increase the circulation in the metal pad and the deformation of its upper surface. The forces associated with large horizontal currents can generate waves in the metal pads (as indicated by dotted line 25), the amplitude of which is a large percentage of the normal anode-to-cathode distance. In any case, horizontal currents will force an increase of the anode-to-cathode distance because the upper metal surface is highly deformed or unstable. These effects cause a decrease in energy efficiency. The frozen electrolyte 22 reduces horizontal current components when it extends partially below the anode shadow because it limits the lateral extent of travel of such components. However, it is difficult to control the extent of the frozen electrolyte since this material cannot readily be observed during cell operation.

The preferred embodiments of the invention are described in the following with reference to the use of the alumina material of our European application No. 86306584.3 as a preferred solid refractory electrically non-conductive material but it should be understood that other similar materials could be employed including those referred to in detail above.

Figure 2:
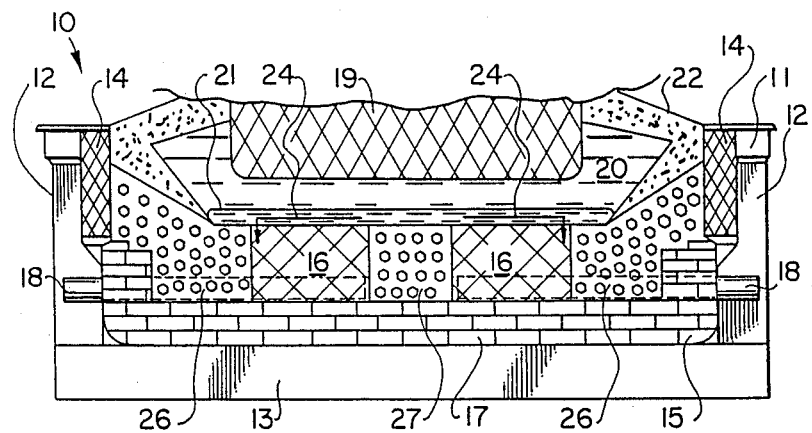
FIG. 2 is a cross-section similar to FIG. 1 of an aluminum reduction cell according to a first preferred embodiment of the present invention.

FIG. 2 is a cross-section similar to FIG. 1 but showing a preferred embodiment of the present invention. An important difference between the cell of FIG. 2 and the cell of FIG. 1 is that the bottom lining 15 of FIG. 2, at least in the upper layers, consists of regions 16 made of electrically conductive carbon block, other conductive carbonaceous material or other electrically conductive heat-resistant material and regions 26 made of unbonded particulate alumina. The important feature is that the electrically conductive regions 16 are separated by the outer particulate alumina regions 26 from the cell side wall lining 14 both at the lateral sides of the cell as shown and desirable at the longitudinal ends of the cell (not shown). Preferably, the electrically conductive regions 16 do not extend beyond the anode shadow, as shown, although in other embodiments the regions could be either within, co-extensive with or lie beyond the anode shadow. The particulate alumina regions 26 provide several advantages. Firstly, they replace a considerable amount of carbonaceous material and thus reduce environmental problems. Secondly they are not attacked by the electrolyte if the metal pad 21 or frozen electrolyte 22 fails to protect the lining in these regions. Thirdly, they reduce the horizontal current components 24 because they limit the lateral extent over which current can flow (since the particulate alumina is non-conductive).

The regions 16 made of electrically conductive carbon or carbonaceous material are preferably centrally separated by a further central region 27 made of particulate alumina. This further reduces the amount of electrically conductive material without significantly increasing cathode voltage drop. As the amount of conductive material is reduced, the current density increases. Preferably the current density should be no greater than 3 amps per square centimetre, so the area of the conductive material should be selected with this limit in mind.

In the longitudinal direction of the cell the electrically conductive regions 16 may be bonded together with suitable cement to form two longitudinally-extending strips separated by particulate alumina regions 26 and 27. However, it is preferred for each electrically conductive block to be separated from its neighbour by particulate alumina regions.

As a result of the use of the invention, the anode-cathode spacing can be reduced, cell operation is simpler cell lining life can be extended and there is less environmental polution.

As a consequence of the shrinkage of the carbonaceous regions 16 to the ends of the current collector bars 18, there is increased collector bar length bearing full current than in conventional cells. This may result in increased potential drop across the cathode, which is undesirable, and this can be eliminated by increasing the cross-sectional area of the collector bars over their whole length or outside the electrically conductive regions of the lining. In one embodiment this is achieved by welding the adjacent collector bars together over part of their length with thick steel plates.

The lower layers of the bottom wall lining 15 can again be made of alumina blocks 16 to provide insulation or other materials or combinations of materials could be employed, e.g., layers of fire brick or insulating "MOLAR" (trademark) brick, with gaps filled with carbonaceous cement.

However, the regions 26 and 27 of particulate alumina should preferably be thick enough in the vertical direction to reach down beyond the solidification isotherm (700°-800° C.) of the electrolyte since the electrolyte may soak into the particulate material.

In the preferred embodiment of the invention in which the regions 16 of the lining are made of carbon blocks, such blocks can be of conventional design, e.g. blocks bonded together with carbonaceous cement. The regions 26 and 27 are made of the packed particulate material as described in our European patent application referred to above, or a bonded material produced from this.

The preferred particulate material consists essentially of alumina, in a form which does not significantly dissolve in the electrolyte, including a substantially close-packed array of alumina shapes, the gaps between the shapes being substantially filled with particulate alumina in one or more fractions having discrete particle size ranges, including a fraction having an average particle diameter not more than 20% of the average diameter of the shapes, the layer having a bulk density of at least 2.0 g/cc.

The material may advantageously also be used with a lower layer which may be a low-density powder chosen for its heat insulating properties. There may also be present one or more intermediate layers of particulate material having a suitable size range to ensure dimensional stability.

At least the upper layer of the material preferably consists essentially of sintered tabular alumina or fused alumina aggregate. Tabular alumina has a good cell life, and can be ground up or cut up for further use at the end of its life.

Other materials are preferably absent from the material or present only in minor proportions. Ground up cryolite from spent cell lining may be present, but at a low concentration to avoid dimensional instability.

The structure of the upper material is preferably provided by a close-packed array of shapes, e.g. spheres, of tabular or fused alumina of 5 to 30 mm, for example 10 to 20 mm, diameter. However, the alumina shapes may be either regular (e.g. spherical) or irregular in appearance. The important requirement is that they can pack to produce a rigid skeleton and a high bulk density. Two factors determine the size of the shapes. If the shapes are too large, then large voids may be left between them by shrinkage or movement of intervening material. If the shapes are too small, they may be easily mechanically displaced by the motion of the cell liquids or mechanical prodding. It has been found that an alumina lining containing a skeletal structure of 20 mm diameter alumina spheres is hard and dimensionally stable.

The gaps between the shapes are substantially filled with particulate alumina in one or more, preferably two or more, fractions having discrete particle size ranges. There is preferably used a coarser fraction having a particle diameter up to 20%, e.g. from 3% to 20% of that of the shapes. Preferably there is also used at least one finer fraction having a particle diameter up to 20%, e.g. from 3% to 20% of that of the next coarser fraction; and so on. The proportions of these fractions are chosen to maximize the density of the resulting mixture. The density of tabular alumina is about 3.8 g/cc, and the bulk density of the mixture should be at least 2.0 and preferably 2.8 g/cc. The effect of this is to keep the void volume of the layer to a minimum. This is desirable because the layer is possibly impregnated by electrolyte during operation of the cell, and it is important that any alteration in the thermal properties of the layer resulting from such impregnation be as small as possible. Once the size of the particulate fractions have been chosen, a skilled worker is readily able to select proportions so as to maximize the bulk density of the mixture.

The preferred method of building this particulate alumina material into the cell is to position the electrically conductive blocks 16 and then to pre-mix the shapes with the particulate alumina fractions and dump the mixture into the shell between the blocks (e.g. in the drift slots) on top of the lower layers provided for heat insulation. Then the mixture is compacted by vibration from above using a flat plate or by vibrating the shell. The discrete size ranges of the shapes and particle fractions and the properties of those fractions are chosen to avoid segregation on vibration or mixing. If segregation were not avoided in this way, then the layer would have to be built up by the laborious process of alternately introducing alumina shapes into the shell and sifting particulate material around them.

A properly built upper layer of tabular alumina is virtually impossible to dig out with a spade, although it is formed of loose particles.

As noted above, the particulate alumina material should extend from the upper surface of the cell floor to a point beyond which further penetration of molten electrolyte will not take place, i.e. generally down to the 700°–800° C. isotherm. In the region where no liquid penetration is expected, different properties are required of the lining. In particular, heat insulation is a dominant requirement in the lower layer of the lining, and lower density materials having substantial void volumes, are preferred. Also, since the potlining contains fluoride-containing gases, lining material should preferably be inert to fluoride and other corrosive gas species. Preferred is metallurgical grade alumina mineralized or calcined substantially to 100% alpha on account of its inertness and low water content. Powdered materials are preferably used and vibrated down to avoid settling or movement in use.

A novel aspect of the invention relates to the modification of the particulate alumina material mentioned above to make it suitable for use either as a wall lining material, or as an improved cell floor lining material. This involves binding the alumina shapes and particles together by means of a binder comprising amorphous alumina.

Amorphous alumina (sometimes called colloidal alumina or sol-gel alumina) is a commercially available product, e.g. from Nyacol Products, The PQ Corporation, Ashland, Maryland, and is normally available as a suspension in water containing about 20% by weight of colloidal alumina. The amount of the colloidal alumina mixed with the particulate alumina material is usually about 0.5–10% by weight (on a dry basis) based on the weight of the particulate alumina mixture. The preferred amount is about 7% by weight (on a dry basis).

The mixing of the amorphous alumina solution with the particulate alumina mixture can be carried out by first forming the alumina mixture by mixing the various size fractions, as explained in our European patent application referred to above, and the adding in the aqueous amorphous alumina suspension and thoroughly mixing. Alternatively, the particulate alumina mixture can be formed and the amorphous alumina suspension can be soaked into it. The resulting product is paste-like or fluid, depending on the water content, but hardens upon drying, the loss of water being completed at 100° C. Prior to drying, the paste-like product can be used as a ramming mix for forming in place, or the flowable product can be cast into desired shapes.

If the product is too fluid, fine alumina can be added to increase the viscosity. This fine alumina may be some that would otherwise be used for the particulate alumina mixture.

The dried product can be used as a heat and molten-metal resistant refractory material in furnaces, ladles etc., but is particularly preferred for use as the sidewall lining 14 and the bottom wall alumina regions 26 and 27 in aluminum reduction cells.

Figure 3:
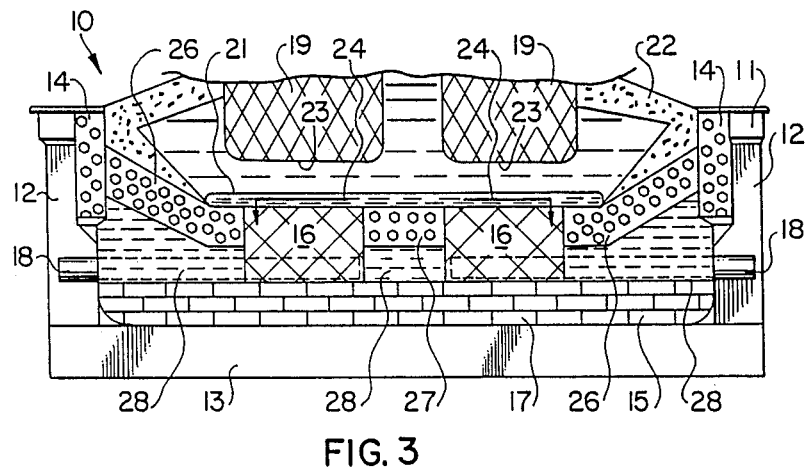
FIG. 3 is a cross-section similar to FIGS. 1 and 2 showing a second preferred embodiment of the present invention.

FIG. 3 shows an aluminum reduction cell similar to FIG. 2 except that the sidewall lining 14 is made of the above alumina product (either formed in place or pre-cast) as well as the bottom wall regions 26 and 27. Since the material is self-supporting, it is suitable to sidewall use whereas the unbonded particulate material is not.

The cell shown in FIG. 3 also has divided anodes 19 and has layers of stabilized alumina 28 below the bonded particulate regions 26 and 27 above the alumina blocks 17. This reduces the amount of bonded particulate alumina required but provides good heat insulation and stability.

What we claim is:

1. An aluminum electrolytic cell having a cell floor and cell walls for containing liquid cell components comprising aluminum and an electrolyte, a lining for said cell floor, a lining for said cell walls and one or more anodes capable of dipping into said liquid electrolyte from above and each having an anode surface spaced from but confronting said cell floor lining, said cell floor lining, at least at the upper surface thereof, comprising a region made of solid electrically conductive material, and at least one region made of a solid refractory electrically non-conductive material extending between the electrically conductive material and the cell wall lining, and at least one current collector bar extending from outside the cell into said cell floor lining beneath said upper surface and forming electrically conductive contact with said solid electrically conductive material, wherein the electrically non-conductive material comprises a close-packed array of alumina shapes, the gaps between the shapes substantially filled with particulate alumina in one or more fractions having discrete particle size ranges, including a fraction having an average particle diameter no more than 20% of the average diameter of the shapes, the mass having a bulk density of at least 2.0 g/cc.

2. A cell according to claim 1 wherein said shapes are made of tabular alumina.

3. A cell according to claim 1 wherein said shapes are made of fused alumina.

4. A cell according to claim 1 wherein the particulate alumina mass is bonded together by amorphous alumina.

5. A cell according to claim 4 wherein the mass contains 0.5 to 10% by weight (on a solids basis) of said amorphous alumina based on the weight of the particulate alumina.

6. A cell according to claim 1 wherein said electrically conductive material consists of carbonaceous material.

7. A cell according to claim 1 wherein the region of solid electrically conductive material is no larger in horizontal extent, at least at the edges thereof closest to the sidewall lining, than the confronting anode surface(s).

8. A cell according to claim 1 wherein there is provided more than one region of solid electrically conductive material at said upper surface of said cell floor lining, each of said electrically conductive regions being separated from the cell wall lining by said at least one region of solid refractory electrically non-conductive material.

9. A cell according to claim 1 wherein the area of said solid electrically conductive material is large enough to produce a cell current density of 3 amps/sq. cm or less.

10. An aluminum electrolytic cell having a cell floor and cell walls for containing liquid cell components comprising aluminum and an electrolyte, a lining for said cell floor, a lining for said cell walls and one or more anodes capable of dipping into said liquid electrolyte from above and each having an anode surface spaced from but confronting said cell floor lining, said cell floor lining, at least at the upper surface thereof, comprising a region made of solid electrically conductive material, and at least one region made of a solid refractory electrically non-conductive material extending between the electrically conductive material and the cell wall lining, and at least one current collector bar extending from outside the cell into said cell floor lining beneath said upper surface and forming electrically conductive contact with said solid electrically conductive material, wherein the electrically non-conductive material comprises alumina containing a layer rich in an alkali or an alkaline earth metal compound capable of reacting with the electrolyte so as to raise the solidus thereof.

11. A cell according to claim 10 wherein said electrically conductive material consists of carbonaceous material.

12. A cell according to claim 10 wherein the region of solid electrically conductive material is no larger in horizontal extent, at least at the edges thereof closest to the sidewall lining, than the confronting anode surface(s).

13. A cell according to claim 10 wherein there is provided more than one region of solid electrically conductive material at said upper surface of said cell floor lining, each of said electrically conductive regions being separated from the cell wall lining by said at least one region of solid refractory electrically non-conductive material.

14. A cell according to claim 10 wherein the area of said solid electrically conductive material is large enough to produce a cell current density of 3 amps/sq. cm or less.

15. An aluminum electrolytic cell having a cell floor and cell walls for containing liquid cell components comprising aluminum and an electrolyte, a lining for said cell floor, a lining for said cell walls and one or more anodes capable of dipping into said liquid electrolyte from above and each having an anode surface spaced from but confronting said cell floor lining, said cell floor lining, at least at the upper surface thereof, comprising a region made of solid electrically conductive material, and at least one region made of a solid refractory electrically non-conductive material extending between the electrically conductive material and the cell wall lining, and at least one current collector bar extending from outside the cell into said cell floor lining beneath said upper surface and forming electrically conductive contact with said solid electrically conductive material, wherein the electrically non-conductive material comprises calcined red mud.

16. A cell according to claim 15 wherein said electrically conductive material consists of carbonaceous material.

17. A cell according to claim 15 wherein the region of solid electrically conductive material is no larger in horizontal extent, at least at the edges thereof closest to the sidewall lining, than the confronting anode surface(s).

18. A cell according to claim 15 wherein there is provided more than one region of solid electrically conductive material at said upper surface of said cell floor lining, each of said electrically conductive regions being separated from the cell wall lining by said at least one region of solid refractory electrically non-conductive material.

19. A cell according to claim 15 wherein the area of said solid electrically conductive material is large enough to produce a cell current density of 3 amps/sq. cm or less.

20. An aluminum electrolytic cell having a cell floor and cell walls for containing liquid cell components comprising aluminum and an electrolyte, a lining for said cell floor, a lining for said cell walls and one or more anodes capable of dipping into said liquid electrolyte from above and each having an anode surface spaced from but confronting said cell floor lining, said cell floor lining, at least at the upper surface thereof, comprising a region made of solid electrically conductive material, and at least one region made of a solid refractory electrically non-conductive material extending between the electrically conductive material and the cell wall lining, and at least one current collector bar extending from outside the cell into said cell floor lining beneath said upper surface and forming electrically conductive contact with said solid electrically conductive material, wherein the electrically non-conductive material comprises a mixture of smelter alumina, sodium aluminate and cryolite.

21. A cell according to claim 20 wherein said electrically conductive material consists of carbonaceous material.

22. A cell according to claim 20 wherein the region of solid electrically conductive material is no larger in horizontal extent, at least at the edges thereof closest to the sidewall lining, than the confronting anode surface(s).

23. A cell according to claim 20 wherein there is provided more than one region of solid electrically conductive material at said upper surface of said cell floor lining, each of said electrically conductive regions being separated from the cell wall lining by said at least one region of solid refractory electrically non-conductive material.

24. A cell according to claim 20 wherein the area of said solid electrically conductive material is large enough to produce a cell current density of 3 amps/sq. cm or less.

25. An aluminum electrolytic cell having a cell floor and cell walls for containing liquid cell components comprising aluminum and an electrolyte, a lining for said cell floor, a lining for said cell walls and one or more anodes capable of dipping into said liquid electrolyte from above and each having an anode surface spaced from but confronting said cell floor lining, said cell floor lining, at least at the upper surface thereof, comprising a region made of solid electrically conductive material, and at least one region made of a solid refractory electrically non-conductive material extending between the electrically conductive material and the cell wall lining, and at least one current collector bar extending from outside the cell into said cell floor lining beneath said upper surface and forming electrically conductive contact with said solid electrically conductive material, wherein the electrically non-conductive material is a castable refractory based on smelter-type alumina in which the main cementing component is $CaO.Al_2O_3$ and the main filling-in component is selected from sandy smelter type alumina, a mixture of sandy smelter type alumina with fused $Al_2O_3.SiO_2$ and a mixture of sandy smelter type alumina and fine fused silica.

26. A cell according to claim 25 wherein said electrically conductive material consists of carbonaceous material.

27. A cell according to claim 25 wherein the region of solid electrically conductive material is no larger in horizontal extent, at least at the edges thereof closest to the sidewall lining, than the confronting anode surface(s).

28. A cell according to claim 25 wherein there is provided more than one region of solid electrically conductive material at said upper surface of said cell floor lining, each of said electrically conductive regions being separated from the cell wall lining by said at least one region of solid refractory electrically non-conductive material.

29. A cell according to claim 25 wherein the area of said solid electrically conductive material is large enough to produce a cell current density of 3 amps/sq. cm or less.

30. An aluminum electrolytic cell having a cell floor and cell walls for containing liquid cell components comprising aluminum and an electrolyte, a lining for said cell floor, a lining for said cell walls and one or more anodes capable of dipping into said liquid electrolyte from above and each having an anode surface spaced from but confronting said cell floor lining, said cell floor lining, at least at the upper surface thereof, comprising a region made of solid electrically conductive material, and at least one region made of a solid refractory electrically non-conductive material extending between the electrically conductive material and the cell wall lining, and at least one current collector bar extending from outside the cell into said cell floor lining beneath said upper surface and forming electrically conductive contact with said solid electrically conductive material, wherein the non-conductive material is an alumina material having a surface which has been subjected to impregnation with an aqueous solution of magnesium fluorosilicate followed by heating to decompose the magnesium fluorosilicate.

31. A cell according to claim 30 wherein said treated surface has also been coated with a silicate.

32. A cell according to claim 31 wherein said silicate coating has also been treated by impregnation with magnesium fluorosilicate followed by heating.

33. A cell according to claim 30 wherein said electrically conductive material consists of carbonaceous material.

34. A cell according to claim 30 wherein the region of solid electrically conductive material is no larger in horizontal extent, at least at the edges thereof closest to the sidewall lining, than the confronting anode surface(s).

35. A cell according to claim 30 wherein there is provided more than one region of solid electrically conductive material at said upper surface of said cell floor lining, each of said electrically conductive regions being separated from the cell wall lining by said at least one region of solid refractory electrically non-conductive material.

36. A cell according to claim 30 wherein the area of said solid electrically conductive material is large enough to produce a cell current density of 3 amps/sq. cm or less.

37. An aluminum electrolytic cell having a cell floor and cell walls for containing liquid cell components comprising aluminum and an electrolyte, a lining for said cell floor, a lining for said cell walls and one or more anodes capable of dipping into said liquid electrolyte from above and each having an anode surface spaced from but confronting said cell floor lining, said cell floor lining, at least at the upper surface thereof, comprising a region made of solid electrically conductive material, and at least one region made of a solid refractory electrically non-conductive material extending between the electrically conductive material and the cell wall lining, and at least one current collector bar extending from outside the cell into said cell floor lining beneath said upper surface and forming electrically conductive contact with said solid electrically conductive material, wherein said lining for said cell walls comprises a solid refractory electrically non-conductive material.

38. A cell according to claim 37 wherein said material used for the linings of the side walls comprises a particulate alumina mass consisting of a close-packed array of alumina shapes, the gaps between the shapes substantially filled with particulate alumina in one or more fractions having discrete particle size ranges, including a fraction having an average particle diameter no more than 20% of the average diameter of the shapes, the mass having a bulk density of at least 2.0 g/cc, said mass having been bonded together with amorphous alumina.

39. A cell according to claim 37 wherein said material used for the linings of said side walls comprises alumina containing a layer rich in an alkali or alkaline earth metal compound capable of reacting with the electrolyte so as to raise the solidus thereof.

40. A cell according to claim 37 wherein said material used for the linings of said side walls comprises calcined red mud.

41. A cell according to claim 37 wherein said material used for the linings of said side walls comprises a mixture of smelter alumina, sodium aluminate and cryolite.

42. A cell according to claim 37 wherein said material used for the linings of said side walls comprises a castable refractory based on smelter-type alumina in which the main cementing component is $CaO.Al_2O_3$ and the main filling-in component is selected from sandy smelter type alumina, a mixture of sandy smelter type alumina with fused $Al_2O_3.SiO_2$ and a mixture of sandy smelter type alumina and fine fused silica.

43. A cell according to claim 37 wherein said material used for the linings of said side walls comprises an alumina material having a surface which has been subjected to impregnation with an aqueous solution of magnesium fluorosilicate followed by heating to decompose the magnesium fluorosilicate.

44. A cell according to claim 43 wherein said treated surface has also been coated with a silicate.

45. A cell according to claim 44 wherein said silicate coating has also been treated by impregnation with magnesium fluorosilicate followed by heating.

46. A cell according to claim 37 wherein said electrically conductive material consists of carbonaceous material.

47. A cell according to claim 37 wherein the region of solid electrically conductive material is no larger in horizontal extent, at least at the edges thereof closest to the sidewall lining, than the confronting anode surface(s).

48. A cell according to claim 37 wherein there is provided more than one region of solid electrically conductive material at said upper surface of said cell floor lining, each of said electrically conductive regions being separated from the cell wall lining by said at least one region of solid refractory electrically non-conductive material.

49. A cell according to claim 37 wherein the area of said solid electrically conductive material is large enough to produce a cell current density of 3 amps/sq. cm or less.

50. An aluminum electrolytic cell having a cell floor and cell walls for containing liquid cell components comprising aluminum and an electrolyte, a lining for said cell floor, a lining for said cell walls and one or more anodes capable of dipping into said liquid electrolyte from above and each having an anode surface spaced from but confronting said cell floor lining, said cell floor lining, at least at the upper surface thereof, comprising a region made of solid electrically conductive material, and at least one region made of a solid refractory electrically non-conductive material extending between the electrically conductive material and the cell wall lining, and at least one current collector bar extending from outside the cell into said cell floor lining beneath said upper surface and forming electrically conductive contact with said solid electrically conductive material, wherein said current collector bars have increased current carrying area in a section outside said region of solid electrically conductive material.

51. A cell according to claim 50 wherein said electrically conductive material consists of carbonaceous material.

52. A cell according to claim 50 wherein the region of solid electrically conductive material is no larger in horizontal extent, at least at the edges thereof closest to the sidewall lining, than the confronting anode surface(s).

53. A cell according to claim 50 wherein there is provided more than one region of solid electrically conductive material at said upper surface of said cell floor lining, each of said electrically conductive regions being separated from the cell wall lining by said at least one region of solid refractory electrically non-conductive material.

54. A cell according to claim 50 wherein the area of said solid electrically conductive material is large enough to produce a cell current density of 3 amps/sq. cm or less.

55. A material suitable for use as a lining of an aluminum electrolytic cell, said material comprising: a close-packed array of alumina shapes, the gaps between the shapes being substantially filled with particulate alumina in one or more fractions having discrete particle size ranges, including a fraction having an average particle diameter not more than 20% of the average diameter of the shapes, said shapes and particles being bonded together by an amorphous alumina binder.

56. A material according to claim 55 having a bulk density of at least 2.0 g/cc.

57. A material according to claim 55 wherein the amount of amorphous alumina is 0.5 to 10% by weight (on a dry weight basis) based on the total weight of the alumina shapes and particles.

58. A material according to claim 55 wherein the amount of amorphous alumina is about 7% by weight (on a dry weight basis) based on the total weight of the alumina shapes and particles.

59. A material according to claim 55 wherein the alumina shapes are made of tubular alumina.

60. A material according to claim 55 wherein the alumina shapes are made of fused alumina.

61. A method of modifying an aluminum electrolytic cell having a cell floor, cell walls upstanding from said floor, a carbonaceous lining for said floor, a carbonaceous lining for said cell walls, one or more anodes spaced from but confronting said cell floor lining, and at least one current collector bar extending from outside said cell generally horizontally into said cell floor lining beneath an upper surface thereof, in order to reduce undesired magnetohydrodynamic effects and to reduce environmental pollution; said method comprising:
 replacing said cell floor lining with a lining comprising, at least at an upper surface thereof, a region made of solid electrolytically conductive material in electrically conductive contact with said at least one current collector bar, and at least one region made of a solid refractory electrically non-conductive material extending between the electrically conductive material and the cell wall lining, wherein said method further includes replacing said carbonaceous cell wall lining with a lining made of a solid refractory electrically non-conductive material.

* * * * *